United States Patent
Kuriyama

(10) Patent No.: US 10,750,106 B2
(45) Date of Patent: Aug. 18, 2020

(54) IMAGING UNIT, IMAGING APPARATUS, AND COMPUTER-READABLE MEDIUM HAVING STORED THEREON A CONTROL PROGRAM

(71) Applicant: NIKON CORPORATION, Tokyo (JP)

(72) Inventor: Takashi Kuriyama, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/800,493

(22) Filed: Nov. 1, 2017

(65) Prior Publication Data
US 2018/0054577 A1    Feb. 22, 2018

Related U.S. Application Data

(63) Continuation of application No. 14/851,785, filed on Sep. 11, 2015, now abandoned, which is a (Continued)

(30) Foreign Application Priority Data

Mar. 14, 2013  (JP) ................................ 2013-052202

(51) Int. Cl.
*H04N 5/355* (2011.01)
*H04N 5/235* (2006.01)
(Continued)

(52) U.S. Cl.
CPC .......... *H04N 5/3559* (2013.01); *H04N 3/155* (2013.01); *H04N 5/2353* (2013.01);
(Continued)

(58) Field of Classification Search
CPC ...... H04N 5/361; H04N 5/378; H04N 5/3532; H04N 5/374; H04N 5/2353;
(Continued)

(56) References Cited

U.S. PATENT DOCUMENTS 6,421,086 B1    7/2002  Kuno et al.
6,480,226 B1    11/2002 Takahashi et al.
(Continued)

FOREIGN PATENT DOCUMENTS

JP    H03-143080 A    6/1991
JP    2002-277922 A   9/2002
(Continued)

OTHER PUBLICATIONS

Jun. 10, 2014 Search Report issued in International Patent Application No. PCT/JP2014/001297.
(Continued)

*Primary Examiner* — Nelson D. Hernández Hernández
(74) *Attorney, Agent, or Firm* — Oliff PLC

(57) ABSTRACT

Provided is an imaging unit including an imaging section that includes a pixel capable of performing charge accumulation a plurality of times in response to an imaging instruction for generating one frame of image data; a storage section that stores a pixel signal based on output from the pixel; an updating section that updates the pixel signal already stored in the storage section by performing an integration process to integrate the pixel signal output from the pixel as a result of a new charge accumulation and the pixel signal already stored in the storage section; and a control section that controls whether the updating section performs the update, for each of a plurality of pixel groups that each include one or more pixels.

17 Claims, 10 Drawing Sheets

Related U.S. Application Data continuation of application No. PCT/JP2014/001297, filed on Mar. 7, 2014.

(51) Int. Cl.
*H04N 5/353* (2011.01)
*H04N 5/369* (2011.01)
*H04N 3/14* (2006.01)
*H04N 5/374* (2011.01)

(52) U.S. Cl.
CPC ........... *H04N 5/2355* (2013.01); *H04N 5/353* (2013.01); *H04N 5/3535* (2013.01); *H04N 5/35545* (2013.01); *H04N 5/35554* (2013.01); *H04N 5/374* (2013.01); *H04N 5/379* (2018.08)

(58) Field of Classification Search
CPC ........... H04N 5/23212; H04N 5/23245; H04N 5/35554; H04N 9/045; H04N 5/235; H04N 5/353; H04N 5/3559; H04N 5/379; H04N 5/2355; H04N 5/3535; H04N 5/35545; H01L 27/14643; H01L 27/14636; H01L 27/14603
See application file for complete search history.

(56) References Cited

U.S. PATENT DOCUMENTS

| | | | |
|---|---|---|---|
| 9,571,767 B2* | 2/2017 | Tsunai | .............. H04N 5/355 |
| 2005/0243195 A1* | 11/2005 | Parks | .................. H04N 9/045 |
| | | | 348/311 |
| 2006/0023109 A1 | 2/2006 | Mabuchi et al. | |
| 2006/0268151 A1 | 11/2006 | Yamashita | |
| 2007/0195182 A1 | 8/2007 | Ito | |
| 2008/0002030 A1 | 1/2008 | Sakurai et al. | |
| 2008/0042046 A1 | 2/2008 | Mabuchi | |
| 2009/0073306 A1* | 3/2009 | Kwon | ................. H04N 5/2352 |
| | | | 348/362 |
| 2010/0276572 A1* | 11/2010 | Iwabuchi | .............. H01L 23/481 |
| | | | 250/208.1 |
| 2011/0096216 A1 | 4/2011 | Kawai et al. | |
| 2012/0314124 A1* | 12/2012 | Kaizu | .................. H04N 5/2353 |
| | | | 348/362 |
| 2013/0208147 A1 | 8/2013 | Koshiba | |
| 2015/0015760 A1 | 1/2015 | Tsunai | |

FOREIGN PATENT DOCUMENTS

| | | |
|---|---|---|
| JP | 2003-259234 A | 9/2003 |
| JP | 2005-065119 A | 3/2005 |
| JP | 2012-151847 A | 8/2012 |
| JP | 2012/182657 A | 9/2012 |
| JP | 2013-005017 A | 1/2013 |
| WO | 2012042967 A1 | 4/2012 |

OTHER PUBLICATIONS

Jun. 30, 2016 Partial Supplementary Search Report issued in European Patent Application No. 14765589.8.
Oct. 5, 2016 Search Report issued in European Patent Application No. 14765589.8.
Nov. 4, 2016 Office Action issued in U.S. Appl. No. 14/851,785.
Jun. 1, 2017 Office Action in U.S. Appl. No. 14/851,785.
Jan. 25, 2018 Office Action issued in Chinese Application No. 201480024545.4.
May 8, 2018 Office Action issued in Japanese Application No. 2015-505279.
Jan. 8, 2018 Office Action issued in European Application No. 14 765 589.8.
Jan. 8, 2019 Office Action issued in Japanese Application No. 2015-505279.
May 20, 2019 Office Action issued in Chinese Patent Application No. 201480024545.4.
Jul. 9, 2019 Office Action issued in Japanese Patent Application No. 2018-129444.
May 12, 2020 Office Action issued in Indian Patent Application No. 8990/DELNP/2015.

\* cited by examiner

IMAGING UNIT, IMAGING APPARATUS, AND COMPUTER-READABLE MEDIUM HAVING STORED THEREON A CONTROL PROGRAM

This application is a continuation application of U.S. patent application Ser. No. 14/851,785 filed on Sep. 11, 2015, which in turn claims priority to the following Japanese and PCT patent applications, which are incorporated herein by reference:

NO. 2013-052202 filed on Mar. 14, 2013, and
NO. PCT/JP2014/001297 filed on Mar. 7, 2014.

BACKGROUND

1. Technical Field

The present invention relates to an imaging unit, an imaging apparatus, and an imaging control program.

2. Related Art

An imaging unit is known in which a backside illumination imaging chip and a signal processing chip are connected via micro bumps to pixels grouped in cell units.

PRIOR ART DOCUMENTS

Patent Documents

Patent Document 1: Japanese Patent Application Publication No. 2006-49361

When the incident light has high intensity and the charge accumulation time is shortened in combination with a large amount of charge being converted, the signal read from the region where the incident light has low intensity becomes small. On the other hand, when the charge accumulation time is made longer for a region where the incident light has low intensity, the signal read from the region where the incident light has high intensity becomes saturated. As a result, the dynamic range of the imaging unit is limited to a narrow range.

SUMMARY

According to a first aspect of the present invention, provided is an imaging unit comprising an imaging section that includes a pixel capable of performing charge accumulation a plurality of times in response to an imaging instruction for generating one frame of image data; a storage section that stores a pixel signal based on output from the pixel; an updating section that updates the pixel signal already stored in the storage section by performing an integration process to integrate the pixel signal output from the pixel as a result of a new charge accumulation and the pixel signal already stored in the storage section; and a control section that controls whether the updating section performs the update, for each of a plurality of pixel groups that each include one or more pixels.

According to a second aspect of the present invention, provided is an imaging apparatus comprising the imaging unit described above; an imaging instruction section that generates the imaging instruction to be transmitted to the imaging unit; and an image processing section that generates the image data by processing the pixel signal from the storage section.

According to a third aspect of the present invention, provided is a computer-readable medium storing thereon an imaging control program that causes a computer to perform, by at least some pixels forming an imaging section, charge accumulation a plurality of times in response to an imaging instruction for generating one frame of image data; store, in a storage section, a pixel signal based on output from the at least some pixels; determine whether to update the pixel signal stored in the storage section for each of a plurality of pixel groups that each include one or more pixels; and update the pixel signal already stored in the storage section by performing an integration process to integrate the pixel signal output from the pixel as a result of a new charge accumulation and the pixel signal already stored in the storage section, when it is determined that the update is to be performed.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
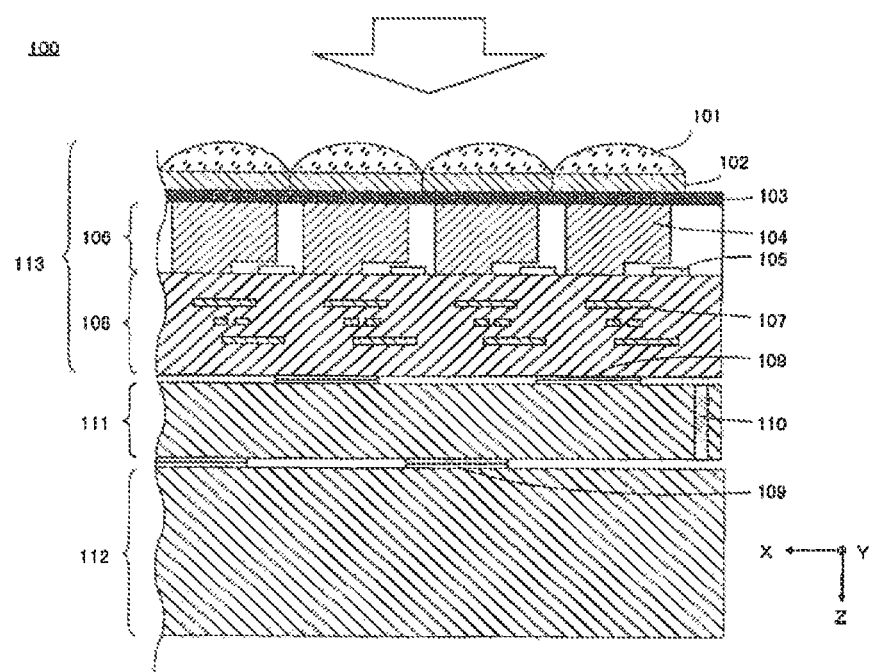
FIG. 1 is a cross-sectional view of a backside illumination MOS imaging element according to the present embodiment.

FIG. 1 is a cross-sectional view of a backside illumination imaging element 100 according to the present embodiment. The imaging element 100 includes an imaging chip 113 that outputs a pixel signal corresponding to incident light, a signal processing chip 111 that processes the pixel signal, and a memory chip 112 that stores the pixel signal. The imaging chip 113, the signal processing chip 111, and the memory chip 112 are layered, and connected electrically to each other by conductive bumps 109 made of copper or the like.

As shown in the drawing, the incident light is primarily incident in a positive direction on the Z axis indicated by the white arrow. In the present embodiment, the surface of the imaging chip 113 on which the incident light is incident is referred to as the back surface. Furthermore, as shown by the coordinate axes, the direction toward the left of the page and orthogonal to the Z axis is the positive direction on the X axis, and the direction toward the reader from the page and orthogonal to the Z axis and the X axis is the positive direction on the Y axis. In several of the following drawings, the coordinate axes of FIG. 1 are used as a reference and these coordinate axes are shown to describe the orientation in each drawing.

One example of the imaging chip 113 is a backside illumination MOS image sensor. A PD layer 106 is arranged on the back surface side of the wiring layer 108. The PD layer 106 includes a plurality of PDs (photodiodes) 104 arranged two-dimensionally, and a plurality of transistors 105 arranged corresponding to the PDs 104.

Color filters 102 are arranged on the incident surface side of the PD layer 106 where the light is incident, with a passivation film 103 interposed therebetween. The color filters 102 include various types that pass different wavelength regions from each other, and have a prescribed arrangement corresponding respectively to the PDs 104. The arrangement of the color filters 102 is described further below. A set of a color filter 102, a PD 104, and a transistor 105 forms one pixel.

Microlenses 101 are provided on the incident sides of the color filters 102 where the light is incident, corresponding to each pixel. The microlenses 101 focus the incident light toward the corresponding PDs 104.

The wiring layer 108 includes wiring 107 that transmits pixel signals from the PD layer 106 to the signal processing chip 111. The wiring 107 may be multi-layered, and may be provided with passive elements and active elements.

A plurality of bumps 109 are arranged on the front surface of the wiring layer 108. By aligning these bumps 109 with a plurality of bumps 109 provided on the surface of the signal processing chip 111 facing the imaging chip 113 and applying pressure to the imaging chip 113 and signal processing chip 111, for example, the aligned bumps 109 bond with each other to form an electrical connection.

In the same manner, a plurality of bumps 109 are arranged on surfaces of the signal processing chip 111 and the memory chip 112 facing each other. By aligning theses bumps 109 with each other and applying pressure to the signal processing chip 111 and memory chip 112, for example, the aligned bumps 109 bond with each other to form an electrical connection.

The bonding between the bumps 109 is not limited to copper bump bonding through solid phase diffusion, and may instead employ micro bump bonding through solder fusing. Furthermore, the bumps 109 may be provided such that one bump corresponds to one pixel group, which is described further below, for example. Accordingly, the size of each bump 109 may be greater than the pitch of the PDs 104. Bumps that are larger than bumps 109 corresponding to a pixel region where the pixels are arranged may be provided in a peripheral region outside of the pixel region.

The signal processing chip 111 includes a TSV (through-silicon via) 110 that connects the circuits on the front and back surfaces of the signal processing chip 111 to each other. The TSV 110 is preferably provided in a peripheral region. A TSV 110 may also be provided in the peripheral region of the imaging chip 113 and the memory chip 112.

Figure 2:
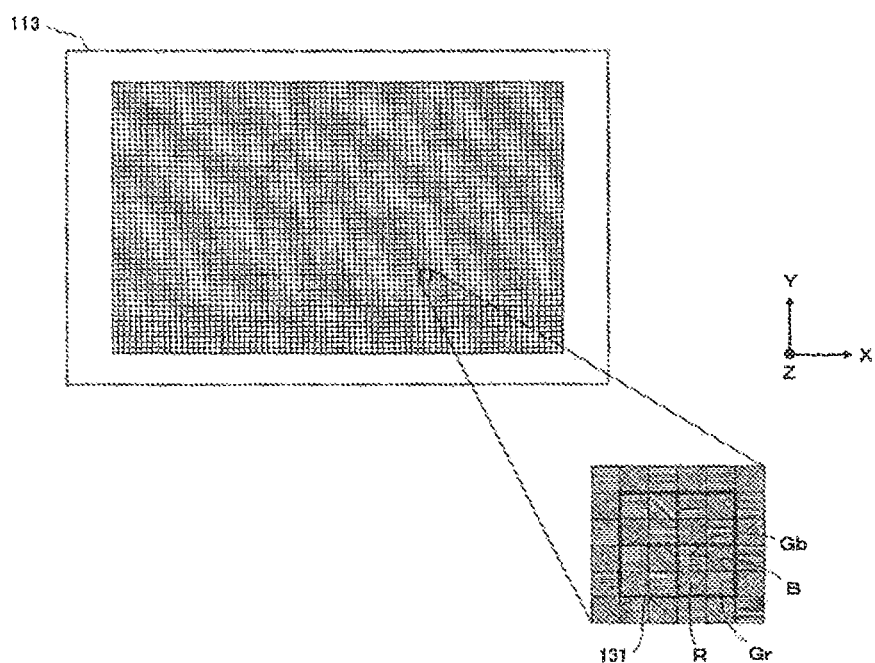
FIG. 2 is a view for describing unit groups and the pixel arrangement of the imaging chip.

FIG. 2 is a view for describing unit groups 131 and the pixel arrangement of the imaging chip 113. In particular, FIG. 2 shows a state in which the imaging chip 113 is viewed from the back surface side. At least 20 million pixels are arranged in a matrix formation in the pixel region. In the present embodiment, a set of 16 pixels adjacent to each other in a 4×4 arrangement form one group. The grid lines in the drawing indicate the formation of the unit groups 131 obtained by grouping adjacent pixels.

As shown in the magnified view of a portion of the pixel region, a unit group 131 has a so-called Bayer arrangement formed by four pixels including green pixels Gb and Gr, a blue pixel B, and a red pixel R formed at the four corners of a square. The green pixels include green filters as the color filters 102, and receive light in the green wavelength band in the incident light. In the same manner, the blue pixels include blue filters as the color filters 102 and receive light in the blue wavelength band, and the red pixels include red filters as the color filters 102 and receive light in the red wavelength band.

Figure 3:
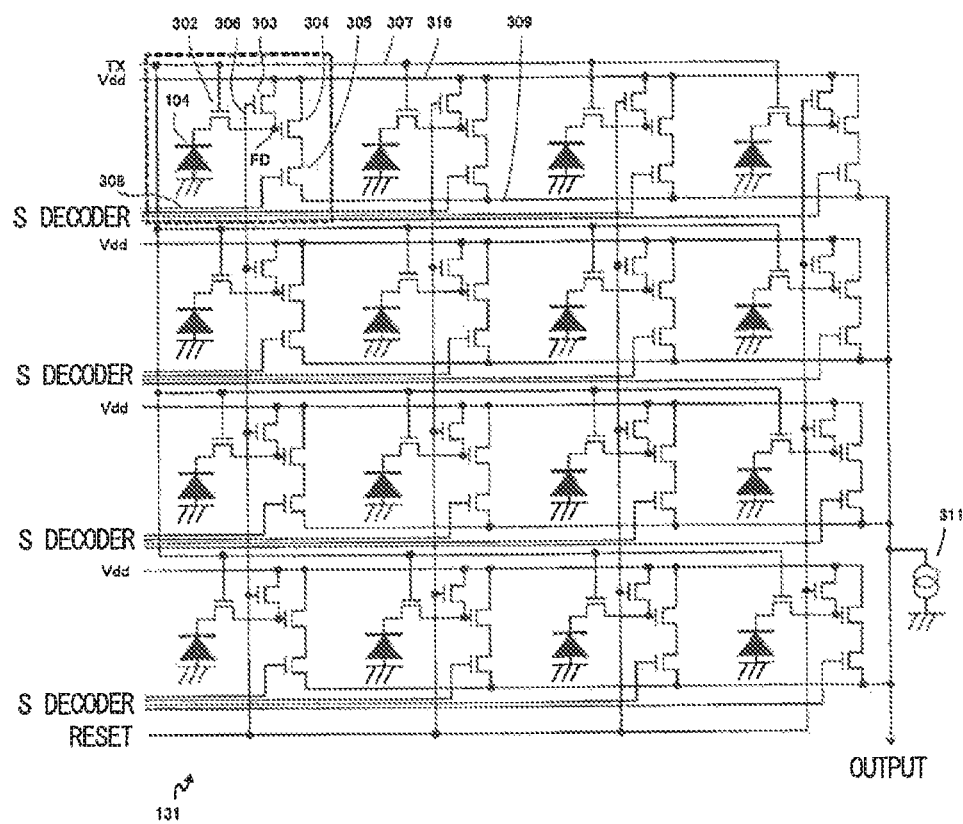
FIG. 3 is a circuit diagram corresponding to a unit group of the imaging chip.

FIG. 3 is a circuit diagram corresponding to a unit group 131 of the imaging chip 113. In the drawing, the representative rectangle formed by the dotted lines represents a circuit corresponding to one pixel. At least some of the transistors described below correspond to the transistor 105 of FIG. 1.

As described above, the unit group 131 is formed by 16 pixels. The 16 PDs 104 corresponding respectively to the 16 pixels are each connected to a transfer transistor 302, and each gate of each transfer transistor 302 is connected to a TX wire 307 that is supplied with a transmission pulse. In the present embodiment, one TX wire 307 is connected in common to the 16 transfer transistors 302.

The drain of each transfer transistor 302 is connected to the source of a corresponding reset transistor 303, and a so-called floating diffusion FD between the drain of the transfer transistor 302 and the source of the reset transistor 303 is connected to the gate of each amplification transistor 304. The drain of each reset transistor 303 is connected to a Vdd wire 310 that is supplied with a power supply voltage, and the gate of each reset transistor 303 is connected to a reset wire 306 supplied with a reset pulse. In the present embodiment, the reset wire 306 is connected in common to the 16 reset transistors 303.

The drain of each amplification transistor 304 is connected to the Vdd wire 310 that is supplied with the power supply voltage. The source of each amplification transistor 304 is connected to the drain of the corresponding selection transistor 305. The gate of each selection transistor is connected to a decoder wire 308 that is supplied with a selection pulse. In the present embodiment, a decoder wire 308 is provided independently for each of the 16 selection transistors 305. The source of each selection transistor 305 is connected to a common output wire 309. A load current source 311 supplies current to the output wire 309. In other words, the output wire 309 is formed by a source follower for the selection transistors 305. The load current source 311 may be provided on the imaging chip 113 side or on the signal processing chip 111 side.

The following describes the flow from when the charge accumulation is begun to when pixel output is performed after charge accumulation is finished. When the reset pulse is applied to the reset transistor 303 through the reset wire 306 and, at the same time, the transmission pulse is applied to the transfer transistor 302 through the TX wire 307, the potentials of the floating diffusion FD and the PD 104 are reset.

When the application of the transmission pulse is stopped, the PD 104 converts the received incident light into a charge and accumulates the charge. After this, when the transmission pulse is again applied without a reset pulse being applied, the accumulated charge is transferred to the floating diffusion FD and the potential of the floating diffusion FD changes from the reset potential to the signal potential after the charge accumulation. When the selection pulse is applied to the selection transistor 305 through the decoder wire 308, the change in the signal potential of the floating diffusion FD is communicated to the output wire 309 through the amplification transistor 304 and the selection transistor 305. As a result, a pixel signal corresponding to the reset potential and the signal potential is output to the output wire 309 from a single pixel.

As shown in the drawing, in the present embodiment, the reset wire 306 and the TX wire 307 are provided in common to the 16 pixels forming a unit group 131. In other words, each reset pulse and each transmission pulse are applied to all 16 pixels at the same time. Accordingly, for all of the pixels forming a unit group 131, the charge accumulation begins at the same timing and the charge accumulation ends at the same timing. However, the pixel signals corresponding to the accumulated charges are output selectively to the output wire 309 as a result of the selection pulses being sequentially applied to each selection transistor 305.

By configuring the circuit using unit groups 131 as a standard in this manner, it is possible to control the charge accumulation time for each unit group 131. Since the charge accumulation time can be controlled for each unit group, it is possible to output pixel signals realized over different charge accumulation times from adjacent unit groups 131. Furthermore, it is possible to perform control in which a common charge accumulation time is set for all of the unit groups 131, charge accumulation and pixel signal output are performed once by certain unit groups 131, and charge accumulation and pixel signal output are performed twice by adjacent unit groups 131. This type of control to repeat the charge accumulation and pixel signal output acquired over a common unit time is referred to as unit time control. If unit time control is performed and the start time and end time of the charge accumulation are in synchronization for all of the unit group 131, the reset wire 306 may be connected in common to all of the reset transistors 303 in the imaging chip 113.

The following describes the details of the unit time control in the present embodiment. In particular, the following describes control that includes, for a single imaging instruction, using different numbers of repetitions of the charge accumulation and the pixel signal output among the unit groups 131.

Figure 4:
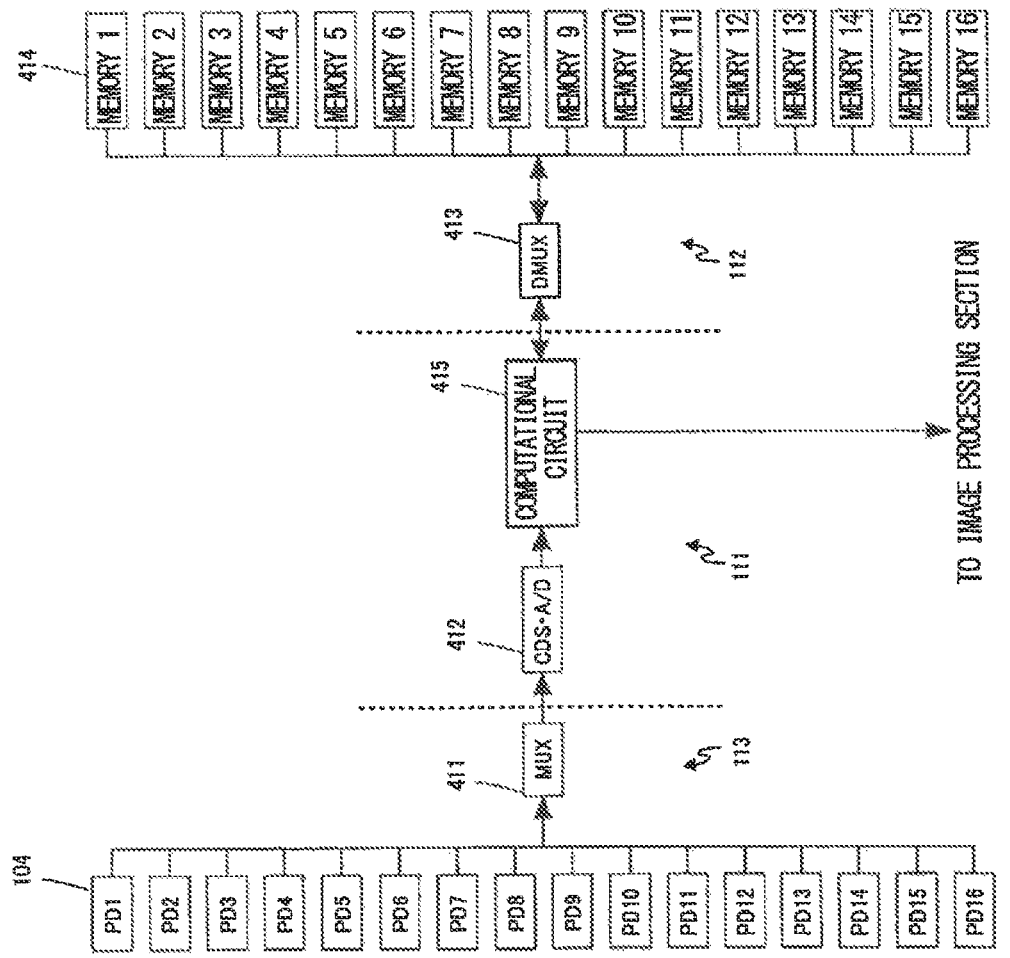
FIG. 4 is a block diagram showing a functional configuration of the imaging element.

FIG. 4 is a block diagram showing a functional configuration of an imaging element 100. In particular, the following describes the flow of the pixel signal.

An analog multiplexer 411 sequentially selects PDs 104 from among the 16 PDs 104 forming a unit group 131 and outputs each of the corresponding pixel signals to the output wire 309. The multiplexer 411 forms the imaging chip 113 together with the PDs 104.

The pixel signals output via the multiplexer 411 undergo correlated double sampling (CDS) and analog/digital (A/D) conversion by a signal processing circuit 412 that performs CDS and A/D conversion and is provided in the signal processing chip 111. The A/D conversion includes converting the input analog pixel signal input into a 12-bit digital pixel signal. The pixel signal resulting from the A/D conversion is transferred to a computational circuit 415 formed in the signal processing chip 111. The computational circuit 415 applies an integration process or the like, which is described further below, to the received pixel signal and transfers the result to a demultiplexer 413.

The demultiplexer 413 stores the received pixel signals respectively in pixel memories 414 corresponding to the pixels. Each pixel memory 414 has a capacity that enables storage of the pixel signal that has undergone the integration process, described further below. The demultiplexer 413 and the pixel memories 414 are formed in the memory chip 112.

The computational circuit 415 reads the corresponding pixel signals used in the integration process from the pixel memory 414 via the demultiplexer 413. Or instead, the pixel signals read from the pixel memories 414 via the demultiplexer 413 are transferred to an image processing section at a later stage, according to a transfer request from the outside. The computational circuit 415 may be provided in the memory chip 112.

FIG. 1 shows the flow of the pixel signals for one group, but this flow is actually performed by each group operating in parallel. However, it is not necessary for the computational circuit 415 to be provided for each group, and a single computational circuit 415 may perform sequential processing while sequentially referencing the values of the pixel memories 414 corresponding to the respective groups.

Figure 5:
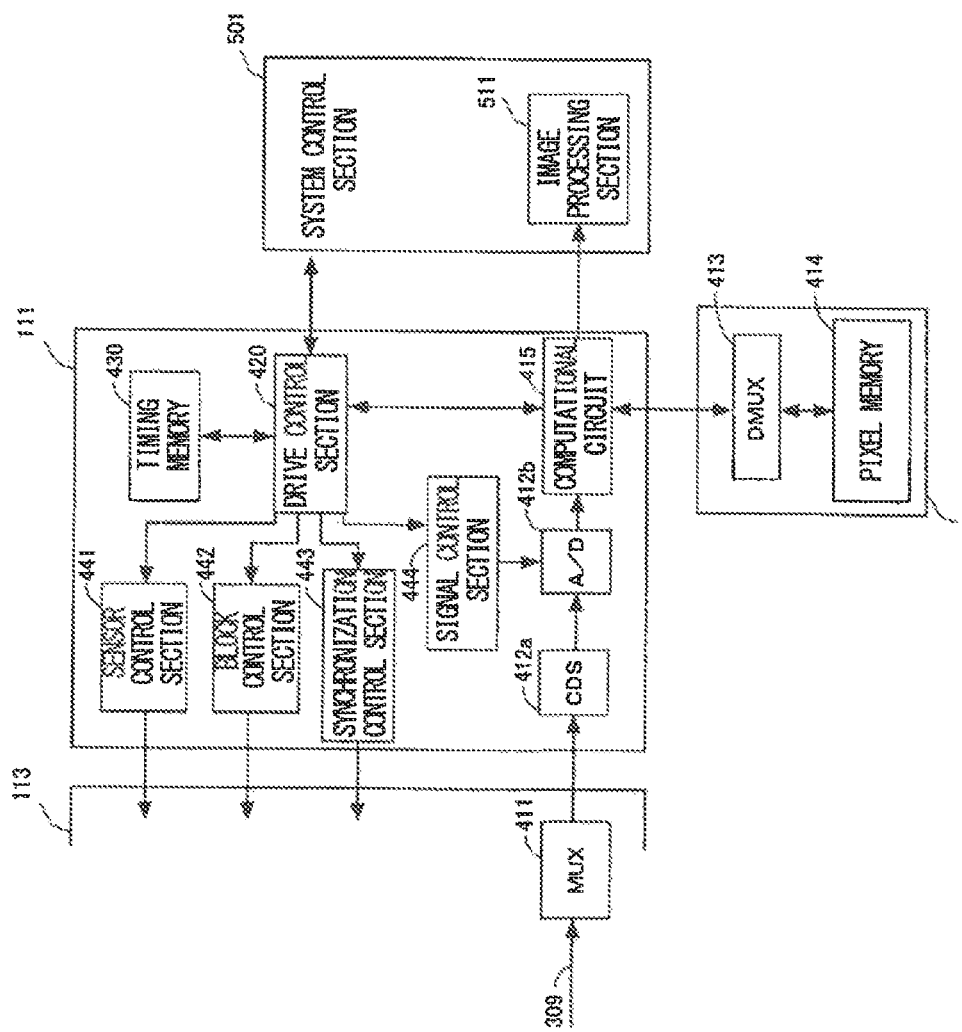
FIG. 5 is a block diagram mainly showing a specific configuration of the signal processing chip.

The following mainly describes an exemplary specific configuration of the signal processing chip 111. FIG. 5 is a block diagram mainly showing a specific configuration of the signal processing chip 111.

The signal processing chip 111 includes a sensor control section 441, a block control section 442, a synchronization control section 443, and a signal control section 444 that perform divided control functions, and a drive control section 420 that performs overall control of these control sections. The drive control section 420 converts instructions from the system control section 501 performing overall control of the imaging apparatus into control signals that can be executed by each control section, and transfers these control signals to the control sections.

The sensor control section 441 controls the transmission of control pulses relating to the charge accumulation and charge reading of each pixel to the imaging chip 113. Specifically, the sensor control section 441 controls the start and end of the charge accumulation by transmitting the reset pulse and the transfer pulse to the target pixel, and causes the output wire 309 to output the pixel signals by transmitting the selection pulse to the pixel being read.

The block control section 442 transmits an identification pulse that identifies a unit group 131 to be the control target to the imaging chip 113. The system control section 501 divides the pixel region of the imaging chip 113 according to characteristics of the scene that is the subject field, as described further below, into a plurality of blocks that each include one or more of the unit groups 131. Pixels included in the same block experience the same time unit control. In other words, for a single imaging instruction, the pixels included in the same block perform the charge accumulation and the pixel signal output the same number of times. The block control section 442 fulfills the role of forming the unit groups 131 into blocks, by transmitting the identification pulse to the unit group 131 that are to be targets based on instructions from the drive control section 420. The transfer pulse and reset pulse received by each pixel through the TX wire 307 and the reset wire 306 are calculated as the AND of each pulse transmitted by the sensor control section 441 and the identification pulse transmitted by the block control section 442. The block formation instructions from the drive control section 420 are described in detail further below.

The synchronization control section 443 transmits a synchronization signal to the imaging chip 113. Each pulse becomes active in the imaging chip 113 in synchronization with the synchronization signal. For example, by adjusting the synchronization signal, random control, thinning control, or the like is realized for control targets including only prescribed pixels from among the pixels associated with the same unit group 131.

The signal control section 444 mainly performs timing control for an A/D converter 412b. The pixel signals output through the output wire 309 are input to a CDS circuit 412a and the A/D converter 412b through the multiplexer 411. The A/D converter 412b is controlled by the signal control section 444 to convert the input pixel signal into digital signals. The pixel signals that have been converted into digital signals are transferred to the computational circuit 415 to undergo the integration process or the like described further below. The pixel signals that have undergone the integration process or the like are transferred to the demultiplexer 413 of the memory chip 112 and stored in the pixel memories 414 corresponding respectively to the pixels, as digital pixel values.

The signal processing chip 111 includes a timing memory 430 that serves as an accumulation control memory and stores block classification information concerning which unit groups 131 are combined to form the blocks and accumulation repetition information that indicates the number of times that the charge accumulation and pixel signal output are repeated by each of the formed blocks. The timing memory 430 is formed by a flash RAM, for example.

As described further below, the system control section 501 determines which unit groups are combined to form the blocks, based on detection results of a luminance distribution detection of the scene performed before the imaging sequence. The determined blocks are classified as block 1, block 2, etc., and each block is defined according to which unit groups 131 are contained therein. The drive control section 420 receives the block classification information from the system control section 501 and stores this information in the timing memory 430.

The system control section 501 determines how many times the charge accumulation and pixel signal output are to be repeated by each block, based on the luminance distribution detection results, for example. The drive control section 420 receives this repetition number information from the system control section 501 and stores this information in the timing memory 430 in association with the corresponding block classification information. By storing the block classification information and the repetition number information in the timing memory 430 in this way, the drive control section 420 can realize a series of the charge accumulation controls independently by sequentially referencing the timing memory 430. In other words, upon receiving the imaging instruction signal for control to acquire one image from the system control section 501, the drive control section 420 can end the accumulation control without receiving instructions from the system control section 501 every time after this for the control of each pixel.

The drive control section 420 receives updated block classification information and repetition number information from the system control section 501, and updates the content stored in the timing memory 430 in a suitable manner. For example, the drive control section 420 updates the timing memory 430 in synchronization with an imaging preparation instruction or an imaging instruction. With this configuration, it is possible to realize higher-speed charge accumulation control and for the system control section 501 to perform other processes in parallel while the drive control section 420 is performing the charge accumulation control.

The drive control section 420 does not only execute the charge accumulation control for the imaging chip 113, but also references the timing memory 430 when performing the reading control. For example, the drive control section 420 references the repetition number information for each block, reads the pixel signals already stored in the pixel memories 414, and transfers these pixel signals to the computational circuit 415. Furthermore, the pixel signals on which a computational process has been performed by the computational circuit 415 are stored again in the pixel memories 414. In other words, the pixel signals in the pixel memories 414 are updated.

The drive control section 420 reads a target pixel signal from a pixel memory 414 through the computational circuit 415 and the demultiplexer 413, according to a transfer request from the system control section 501, and transfers this pixel signal to the image processing section 511 provided in the imaging apparatus. The pixel memories 414 are provided with a data transfer interface to transmit pixel signals according to the transfer request. The data transfer interface is connected to a data transfer line coupled to the image processing section 511. The data transfer line is formed by a data bus in a bus line, for example. In this case, the transfer request from the system control section 501 to the drive control section 420 is performed according to an address designation using an address bus.

The transmission of the pixel signal by the data transfer interface is not limited to using an address designation method, and can use a variety of other methods. For example, a double data rate method can be used in which, when performing data transfer, both the rising and the falling of a clock signal used for the synchronization of each circuit are used. As another example, by omitting a portion of the steps, such as the address designation, a burst transfer method can be used to transmit the data all at once and increase the speed. As another example, a combination of methods can be used, such as the combination of a bus method that uses lines connecting a control section, memory section, and input/output section in parallel and a serial method that includes transmitting data in series one bit at a time.

With this configuration, it is possible for the image processing section 511 to receive only the necessary pixel signals, and therefore the image processing can be completed quickly, particularly in a case where a low-resolution image is being formed, for example. When the computational circuit 415 is performing the integration process, the image processing section 511 does not need to perform the integration process, and therefore the speed of the image process can be increased through function distribution and parallel processing.

Figure 6:
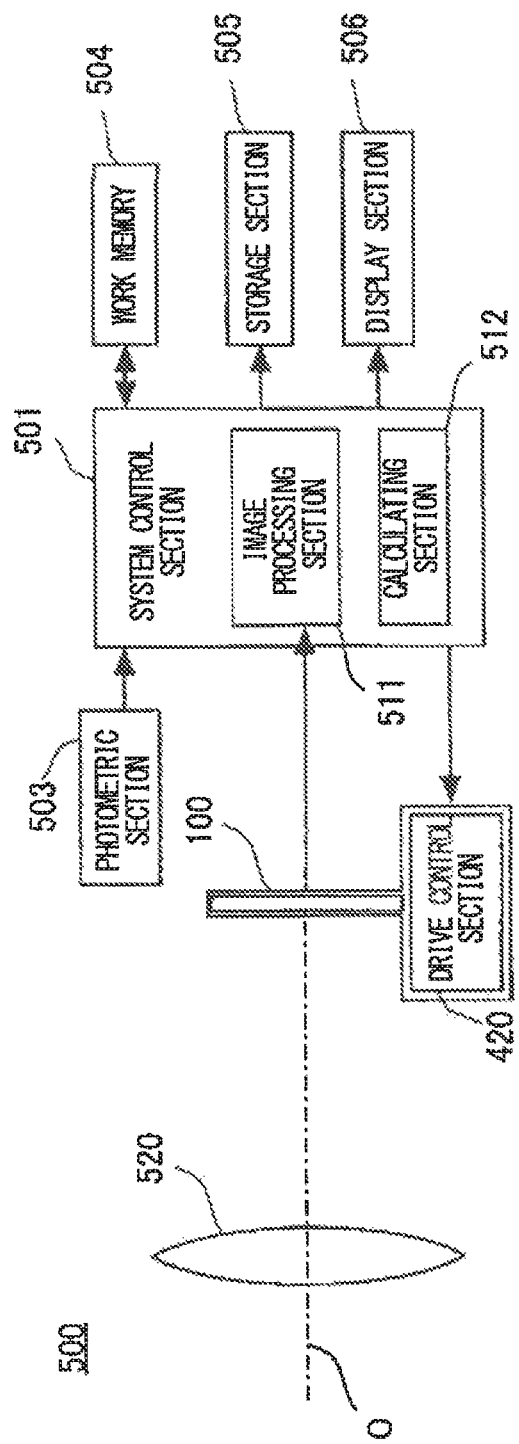
FIG. 6 is a block diagram showing a configuration of an imaging apparatus according to the present embodiment.

FIG. 6 is a block diagram showing a configuration of an imaging apparatus according to the present embodiment. The imaging apparatus 500 includes an imaging lens 520 serving as an imaging optical system, and the imaging lens 520 guides subject light that is incident thereto along the optical axis O to the imaging element 100. The imaging lens 520 may be an exchangeable lens that can be attached to and detached from the imaging apparatus 500. The imaging apparatus 500 mainly includes the imaging element 100, a system control section 501, a photometric section 503, a work memory 504, a recording section 505, and a display section 506. The system control section 501 receives instructions form the user and fulfills a function of an imaging instruction section that generates the imaging instructions to be sent to the imaging element 100.

The imaging lens 520 is formed by a plurality of optical lens groups, and focuses the subject light from the scene near a focal plane. In FIG. 6, the imaging lens 520 is represented by a single virtual lens arranged near the pupil. As described above, the drive control section 420 of the imaging element 100 is a control circuit that performs charge accumulation control such as timing control and region control of the imaging element 100 according to the instructions from the system control section 501.

The imaging element 100 transfers the pixel signals to the image processing section 511 of the system control section 501. The image processing section 511 applies various types of image processing, using the work memory 504 as a work space, to generate the image data. For example, when generating image data in a JPEG file format, the image processing section 511 performs a white balance process, a gamma correction process, or the like and then performs a compression process. The generated image data is recorded in the recording section 505, and is also converted into a display signal and displayed in the display section 506 for a predetermined time. The image processing section 511 may be configured as an ASIC that is independent from the system control section 501.

The photometric section 503 detects the luminance distribution of the scene before the imaging sequence is performed to generate the image data. The photometric section 503 includes an AE sensor with approximately one million pixels, for example. The calculating section 512 of the system control section 501 receives the output of the photometric section 503 and calculates the luminance for each region of the scene. The calculating section 512 determines the ISO sensitivity, the diaphragm value, and the unit time described above, according to the calculated luminance distribution. In the present embodiment, the calculating section 512 further determines how many times the charge accumulation and pixel signal output are to be repeated, according to the unit time determined for a certain pixel group region of the imaging chip 113. The calculating section 512 determines the opening and closing timing of the shutter, by calculating the time until the completion of the charge accumulation of the pixel group region to which the largest number of repetitions is assigned. The calculating section 512 performs the various computations causing the imaging apparatus 500 to operate.

Figure 7A:
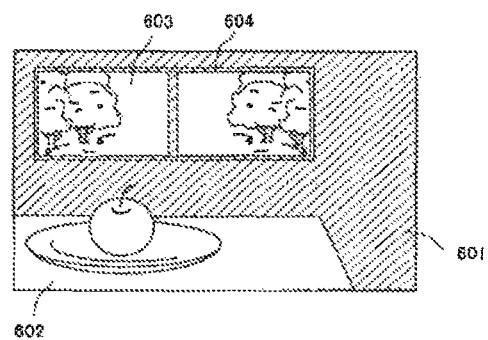
FIG. 7A shows a scene captured by the pixel region of the imaging chip.
Figure 7B:
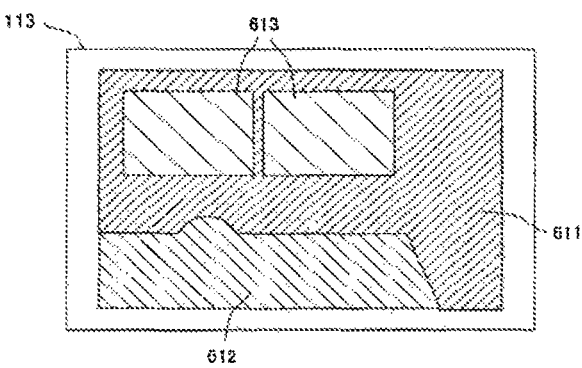
FIG. 7B shows the regional division in the pixel region of the imaging chip.

FIGS. 7A and 7B are views for describing an exemplary scene and the region division. FIG. 7A shows a scene captured by the pixel region of the imaging chip 113. Specifically, in this scene, an intermediate subject 602 and a shadowed subject 601 in an indoor environment are captured at the same time as a highlighted subject 603 in an outdoor environment seen within the window frame 604. When capturing such a scene in which there is a large brightness difference from the highlighted portion to the shadowed portion, if a conventional imaging element is used, black crush occurs in the shadowed portion when the charge accumulation is performed with the highlighted portion as a reference and halation occurs in the highlighted portion when the charge accumulation is performed with the shadowed portion as a reference. In other words, in order to output an image signal where charge accumulation is performed once for both the highlighted portion and the shadowed portion, there is said to be insufficient dynamic range of the photodiode for a scene with a large brightness difference. Therefore, in the present embodiment, the scene is divided into partial regions, which are the highlighted portion and the shadowed portion, and the number of repetitions of the pixel signal reading and charge accumulation of the photodiode corresponding to each region is different, thereby substantially enlarging the dynamic range.

FIG. 7B shows the regional division in the pixel region of the imaging chip 113. The calculating section 512 analyzes the scene of FIG. 7A captured by the photometric section 503, and divides the pixel region based on luminance. For example, the system control section 501 causes the photometric section 503 to perform scene acquisition a plurality of times while changing the exposure time, and the calculating section 512 determines the dividing lines of the pixel region by referencing change in the distribution of regions experiencing halation and regions experiencing black crush. In the example of FIG. 7B, the calculating section 512 divides the pixel region into three regions including a shadowed region 611, an intermediate region 612, and a highlighted region 613.

The dividing lines are defined along the boundaries of unit groups 131. In other words, each region resulting from the division includes an integer number of unit groups 131. The pixels in each group contained in the same region perform charge accumulation and pixel signal output the same number of times, according to the unit time determined by the calculating section 512. Pixels in groups associated with different regions perform the charge accumulation and pixel signal output a different number of times.

Figure 8:
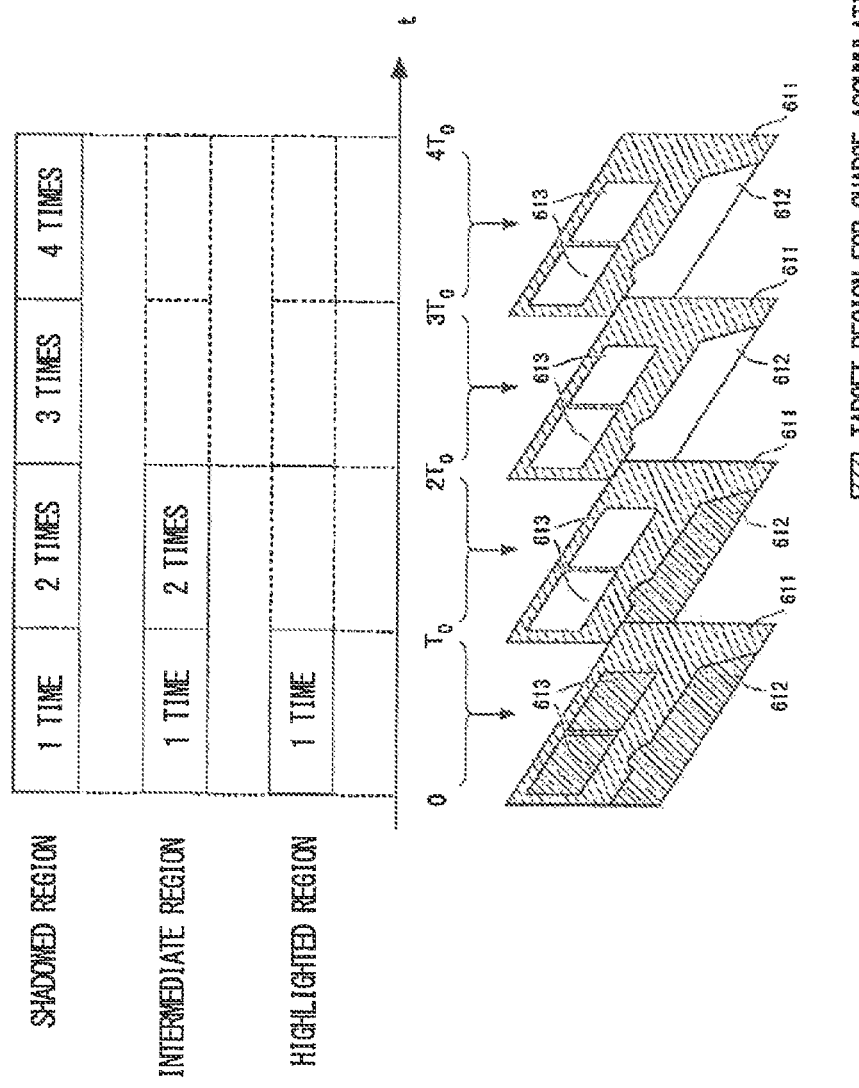
FIG. 8 is a view for describing the charge accumulation control for each region resulting from the division.

FIG. 8 is a view for describing the unit control for each region resulting from the division shown in the example of FIGS. 7A and 7B. Here, an example is described in which the calculating section 512 receives the output of the photometric section 503, calculates that there is approximately one grade of difference between the EV value of the intermediate region 612 and the EV value of the highlighted region 613, and calculates that there is approximately the same one grade of difference between the EV value of the shadowed region 611 and the EV value of the intermediate region 612.

Upon receiving the imaging preparation instruction from the user, the calculating section 512 determines the common unit time $T_0$ that is the charge accumulation time for one instance of charge accumulation from the output of the photometric section 503. The unit time $T_0$ is determined from the EV value of the highlighted region 613, such that the pixels of the highlighted region 613 are not saturated as a result of one charge accumulation. For example, the unit time $T_0$ is determined such that 80% to 90% of the charge that can be accumulated in one charge accumulation operation is accumulated for the pixels corresponding to a portion that is the brightest portion in the highlighted region 613. At this time, the ISO sensitivity correlated to the amplification factor of the output pixel signal and the diaphragm value of the diaphragm provided for the imaging lens 520 are calculated by the calculating section 512, such that the highlighted region 613 is suitably exposed according to the determined unit time $T_0$. The ISO sensitivity is set in common for all of the pixels.

The calculating section 512 references the calculated difference between the EV value of the highlighted region 613 and the EV value of the intermediate region 612, and sets the number of repetitions for the intermediate region 612 to be 2. In other words, the charge accumulation for the unit time $T_0$ and the reading of the pixel signal corresponding to this charge accumulation are repeated two times. In the same manner, the calculating section 512 references the calculated difference between the EV value of the highlighted region 613 and the EV value of the shadowed region 611, and sets the number of charge accumulations for the shadowed region 611 to be 4. In other words, the charge accumulation for the unit time $T_0$ and the reading of the pixel signal corresponding to this charge accumulation are repeated four times. As described further below, the repeatedly read pixel signals are sequentially added together by the computational circuit 415 and stored in the pixel memories 414.

Upon receiving an imaging instruction from the user at time t=0, the drive control section 420 applies the reset pulse and the transfer pulse to pixels in a group associated with all of the regions. This application triggers the start of the charge accumulation for all of these pixels.

At the time $t=T_0$, the drive control section 420 applies the transfer pulse to all of the pixels. The selection pulse is applied sequentially to the pixels in each group, causing each pixel signal to be output to the output wire 309. The drive control section 420 converts each pixel signal into a digital signal using the A/D converter 412b, passes the converted signals through the computational circuit 415, and stores the converted signals in the corresponding pixel memories 414. As a result of this process, the first unit control is finished. The processing of the pixels in the group associated with the highlighted region 613 is then finished. At this point in time, the image generated from the pixel signals stored in the pixel memories 414 corresponding to the pixels of the highlighted region 613 can be expected to be an image having almost no halation or black crush, and with suitable exposure that uses the entire dynamic range of the PDs 104.

When the pixel signals of all of the pixels have been output, the drive control section 420 applies the reset pulse and the transfer pulse again at the time $t=T_0$ to the pixels in the groups associated with the intermediate region 612 and the shadowed region 611, to begin the second charge accumulation. Since time is necessary to select the output of the pixel signals, there is a time difference between the end of the first charge accumulation and the start of the second charge accumulation process. If this time difference cannot be substantially ignored, the second charge accumulation should be started after a delay corresponding to this time difference.

At the time $t=2T_0$, the drive control section 420 applies the transfer pulse to the pixels of the groups associated with the intermediate region 612 and the shadowed region 611. The selection pulse is sequentially applied to the pixels in these groups, causing the pixel signals to be output to the output wire 309. The drive control section 420 converts these pixel signals into digital signals using the A/D converter 412b. In parallel with this process, the pixel signals from the first charge accumulation that are already stored in the corresponding pixel memories 414 are read. The drive control section 420 causes the computational circuit 415 to perform the integration process to add together the pixel signals from the first charge accumulation and the newly acquired pixel signals from the second charge accumulation. The drive control section 420 stores the pixel signals newly generated by this integration process in the corresponding pixel memories 414. As a result, each pixel memory 414 is updated from the pixel signal of the first charge accumulation to the pixel signal resulting from the integration process. With this process, the second unit control is completed. Then, the processing of the pixels in the group associated with the intermediate region 612 is completed.

At this time, the image generated from the pixel signals stored in the pixel memories 414 corresponding to the pixels of the intermediate region 612 can be expected to be an image that has almost no halation or black crush and that is suitably exposed using the entire bit width of the image data. In other words, for an under image that is prone to black crush due to insufficient charge accumulation time when a single unit control is performed, by applying the integration process over two instances of the unit control, it is possible to acquire a suitable image that is equivalent to an image obtained when performing the charge accumulation substantially over the interval of $2T_0$. Furthermore, by dividing the charge accumulation into two instances, random noise can be expected to be lower than in the case of an image obtained by performing a single charge accumulation over the interval of $2T_0$.

When the pixel signals of each pixel in the groups associated with the intermediate region 612 and the shadowed region 611 have been output, the drive control section 420 applies the reset pulse and the transfer pulse again at the time $t=2T_0$ to the pixels of the group associated with the shadowed region 611, to start the third charge accumulation.

At the time $t=3T_0$, the drive control section 420 applies the transfer pulse to the pixels of the group associated with the shadowed region 611. The selection pulse is sequentially applied to the pixels in this group, causing the pixel signals to be output to the output wire 309. The drive control section 420 converts these pixel signals into digital signals using the A/D converter 412b. In parallel with this process, the pixel signals that are already stored in the corresponding pixel memories 414 are read. The drive control section 420 causes the computational circuit 415 to perform the integration process to add together the read pixel signals and the newly acquired pixel signals from the third charge accumulation. The drive control section 420 stores the pixel signals newly generated by this integration process in the corresponding pixel memories 414. As a result, each pixel memory 414 is updated to include the new pixel signal resulting from the integration process. With this process, the third unit control is completed.

Next, the drive control section 420 applies the reset pulse and the transfer pulse again at the time $t=3T_0$ to the pixels of the group associated with the shadowed region 611, to start the fourth charge accumulation.

At the time $t=4T_0$, the drive control section 420 applies the transfer pulse to the pixels of the group associated with the shadowed region 611. The selection pulse is sequentially applied to the pixels in this group, causing the pixel signals to be output to the output wire 309. The drive control section 420 converts these pixel signals into digital signals using the A/D converter 412b. In parallel with this process, the pixel signals that are already stored in the corresponding pixel memories 414 are read. The drive control section 420 causes the computational circuit 415 to perform the integration process to add together the read pixel signals and the newly acquired pixel signals from the fourth charge accumulation. The drive control section 420 stores the pixel signals newly generated by this integration process in the corresponding pixel memories 414. As a result, each pixel memory 414 is updated to include the new pixel signal resulting from the integration process. With this process, the fourth unit control is completed. Then, the processing of the pixels in the group associated with the shadowed region 611 is completed.

At this time, the image generated from the pixel signals stored in the pixel memories 414 corresponding to the pixels of the shadowed region 611 can be expected to be an image that has almost no halation or black crush and that is suitably exposed using the entire bit width of the image data. In other words, for an under image that is prone to black crush due to insufficient charge accumulation time when a single unit control is performed, by applying the integration process over four instances of the unit control, it is possible to acquire a suitable image that is equivalent to an image obtained when performing the charge accumulation substantially over the interval of $4T_0$. Furthermore, by dividing the charge accumulation into four instances, random noise can be expected to be lower than in the case of an image obtained by performing a single charge accumulation over the interval of $4T_0$.

The system control section 501 closes the shutter at the time $t=4T_0$, at which the fourth charge accumulation is finished. The image processing section 511 generates image data with a large dynamic range by combining the pixel signal of each region processed in the manner described above.

In the operation described above, when the unit control has been finished the predetermined number of times for a certain region, the drive control section 420 does not perform later charge accumulation for this region, even though the unit control continuous for other regions. However, the drive control section 420 may continue the charge accumulation for the certain region together with the unit control of other regions. In this case, there is no need for the pixel signal output as a result of the application of the transfer pulse and selection pulse to be performed. As another example, even if the pixel signal output is performed, a process may be performed to delete the pixel signal at any one of the stages including the conversion into a digital signal by the A/D converter 412b, the integration process by the computational circuit 415, the storage in the pixel memories 414, or the like.

Figure 9:
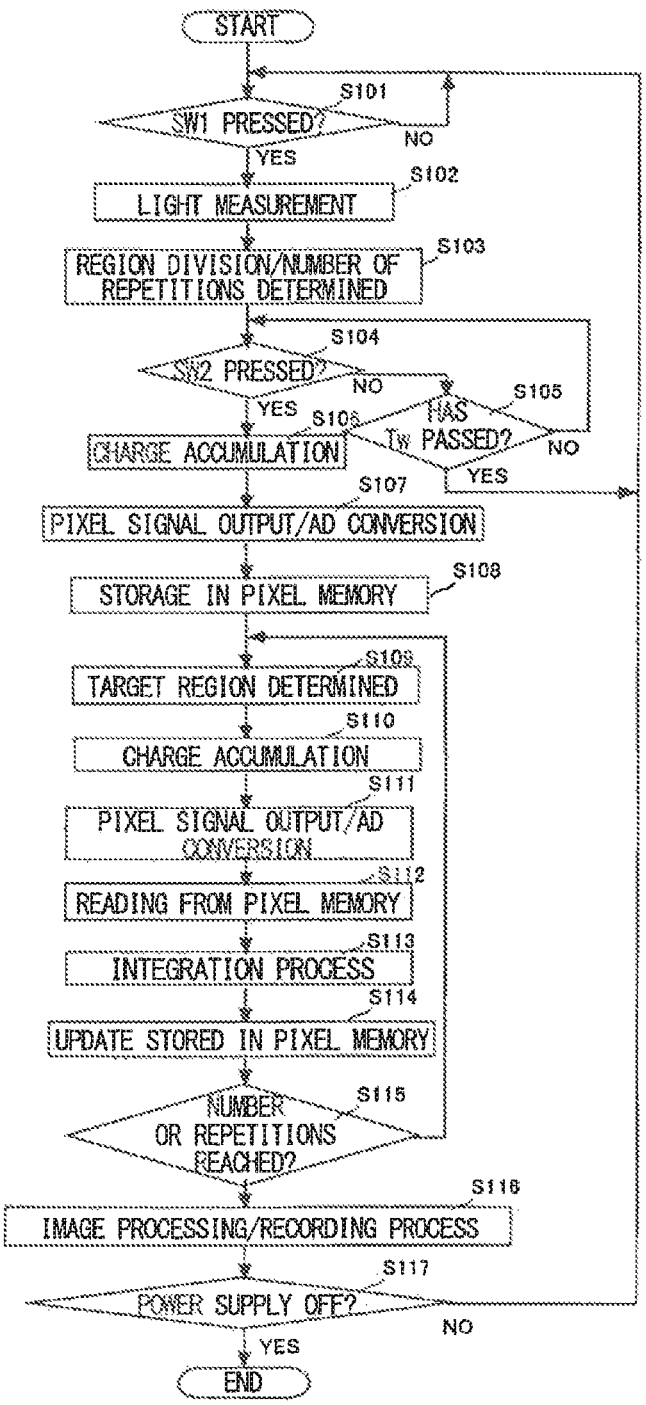
FIG. 9 shows the flow of the imaging operation process.

The following describes an imaging operation process. FIG. 9 shows the flow of the imaging operation process. This flow is started when the power supply of the imaging apparatus 500 is turned ON.

At step S101, the system control section 501 waits in standby until the shutter switch SW1 is pressed, which is the imaging preparation instruction. When pressing of the shutter switch SW1 is detected, the process proceeds to step S102.

At step S102, the system control section 501 performs a light measurement process. Specifically, the output of the photometric section 503 is acquired and the calculating section 512 calculates the luminance distribution of the scene. The process then proceeds to step S103, and the unit time, region divisions, number of repetitions, and the like are determined as described above. This determined information is transmitted to the drive control section 420 from the system control section 501, and stored in the timing memory 430.

When the imaging preparation operation has been completed, the process proceeds to step S104 and the system control section 501 waits in standby until the shutter switch SW2 is pressed, which is the imaging instruction from the user. At this time, if the time that has passed exceeds a predetermined time Tw (YES of step S105), the process returns to step S101. If the pressing of the shutter switch SW2 is detected before the passed time exceeds Tw (NO of step S105), the process proceeds to step S106.

At step S106, the drive control section 420 performs the charge accumulation using all of the pixels, as the first unit control. The output of the pixel signals and the A/D conversion are then performed after the unit time has passed (step S107), and the digital pixel signals resulting from the conversion are stored in the pixel memories 414 (step S108).

Next, the process proceeds to step S109, and the drive control section 420 references the region division information of the timing memory 430 to determine the target regions for the second unit control. The charge accumulation is then performed for the target regions (step S110).

The drive control section 420 performs the pixel signal output and the A/D conversion for the second charge accumulation, after the unit time has passed (step S111). In parallel to this process, or near the timing of this process, the drive control section 420 reads from the pixel memories 414 the pixel signals stored as a result of the first unit control (step S112). The drive control section 420 causes the computational circuit 415 to perform the integration process to integrate the pixel signals resulting from the A/D conversion at step S111 and the pixel signals read at step S112 (step S113). The results of the integration by the computational circuit 415 are used as the new pixel signals to be stored as and update the values in the pixel memories 414 read at step S112 (step S114).

The process proceeds to step S115, and the drive control section 420 references the repetition number information of the timing memory 430 to determine whether the determined number of repetitions has been reached at step S103. If it is determined that the number of repetitions has not been reached, the process proceeds to step S109 and the third, fourth, etc. unit control is performed (step S109 to step S114). If the number of repetitions has been reached, the process proceeds to step S116.

At step S116, the drive control section 420 notifies the system control section 501 that the unit control has been finished and, in response to this notification, the system control section 501 causes the drive control section 420 to transmit the pixel signals stored in the pixel memories 414 to the image processing section 511. The image processing section 511 generates image data, e.g. a JPEG, by performing image processing. The system control section 501 performs a recording process to record the generated image data in the recording section 505.

When the recording process is finished, the process proceeds to step S117, and it is determined whether the power supply of the imaging apparatus 500 has been turned OFF. If it is determined that the power supply is not turned OFF, the process returns to step S101, and the imaging operation process is finished when it is determined that the power supply has been turned OFF.

In the process described above, the drive control section 420 determines that the unit time $T_0$ is a time during which the pixels of the highlighted region 613 are not saturated. Since the highlighted region 613 is determined based on the light measurement results of the photometric section 503, the drive control section 420 determines the unit time $T_0$ every imaging in conjunction with the imaging timing, such as described using the flow of FIG. 9. However, the unit time $T_0$ can be set as a predetermined fixed value, instead of changing dynamically for each imaging.

For example, the unit control for the scene of FIG. 8 is envisioned in a case where the fixed value $T_0=1/256$ seconds is adopted. An example is assumed in which, as a result of the light measurement, the system control section 501 calculates the charge accumulation time for suitable exposure of the highlighted region 613 to be $1/64$ seconds, calculates the charge accumulation time for suitable exposure of the intermediate region 612 to be $1/32$ seconds, and calculates the charge accumulation time for suitable exposure of the shadowed region 611 to be $1/16$ seconds. In this case, the number of repetitions may be determined to be $(1/64) \div (1/256)=4$ for the highlighted region 613, $(1/32) \div (1/256)=8$ for the intermediate region 612, and $(1/16) \div (1/256)=16$ for the shadowed region 611.

Here, the unit time $T_0$ being set as a fixed value means that the charge accumulation cannot be formed during a time shorter than this fixed value, and therefore the unit time $T_0$ is preferably set to a relatively short time so that the unit time control can be performed for bright scenes as well. It should be noted that, in the present embodiment, the integration process is performed using the digital pixel signals resulting from the A/D conversion, and therefore the quantization bit number of the A/D converter 412*b* should be increased to have a value greater than or equal to 1 even in the shadowed region as a result of the charge accumulation performed for the unit time $T_0$. In this case, the pixel memories 414 are set to have storage sizes suitable for this quantization bit number. In a case where the number of bits processed by the image processing section 511 and the number of bits of the pixel signals stored in the pixel memories 414 are different, the pixel signals should be transferred to the image processing section 511 after undergoing a bit conversion process by the computational circuit 415 in synchronization with the transfer request from the system control section 501.

Furthermore, the unit control can be performed without using the light measurement results of the photometric section 503. Specifically, the determination concerning whether to perform another unit control is made by reading the pixel signals from the pixel memories 414, sequentially changing the average value of each unit group or the average value of a set of 25 groups with a 5×5 formation in the horizontal and vertical direction including adjacent unit groups, for example, and determining whether the average value exceeds a threshold value. In other words, as a result of the repetition of the unit control, the unit control is continued for regions that are believed to still be dark images while no further unit control is performed on regions that are believed to be bright images. By performing such an average value determination, it is still possible to realize an image in which the image of each region is near the suitable exposure amount. In this case, normalization using the number of repetitions should be performed when transferring the pixel signals stored in the pixel memories 414 to the image processing section 511. Specifically, each pixel signal should be a value obtained by dividing the pixel signal by the number of repetitions. The value used as the target for determining whether the threshold value is exceeded is not limited to an average value, and can be a calculated value obtained through various statistical processes.

With the imaging apparatus 500 according to the present embodiment, not only is the unit control performed to realize suitable exposure for each region, but it is also possible to perform the unit control in relationship with various image effects. For example, it is possible to set the unit time $T_0$ to be a relatively short time during which hand movement is unlikely to occur, and to perform the repetition of the unit control until the image blur exceeds an allowable amount. In this case, the image blur amount detection can be performed using the detection result of a movement detecting section. The movement detecting section can be realized by the photometric section 503, if the output of a photometric sensor is used, for example, or another motion sensor provided separately can be used. With this unit time control, it is possible to realize an image with little image blur. The amount of brightness lacking when a predetermined charge accumulation time cannot be reached may be adjusted by increasing the amplitude of the pixel signals.

The unit time control can be performed exclusively for each region. For example, in the example of FIG. 8, it is possible to perform the first unit control for only the highlighted region 613, perform the second and third unit controls for only the intermediate region 612, and then perform the fourth to seventh unit controls only for the shadowed region 611. If the unit control is performed exclusively for each region in this manner, it is possible to obtain a multicolor image in which the optical conditions, e.g. the diaphragm value, are changed for each region. More specifically, it is possible to narrow the diaphragm and repeat the unit control a greater number of times for a region including a running waterfall, and to open the diaphragm and perform the unit control a smaller number of times for a region around the waterfall including trees. With this type of control, it is possible for images with different shutter speeds to exist together in a single image, and therefore it is possible to capture images with a single imaging instruction that could not conventionally be captured with a single imaging instruction. If instructions are received in advance from a user through a live view image, for example, it is possible to determine how many times the unit control is to be repeated for certain types of scenes in advance.

The embodiments described above assume a still image as an example, but it is obvious that a moving image can be generated by performing the same unit control for each frame. Furthermore, the present invention is not limited to digital cameras, and the processes described above can also be performed by camera units incorporated in electronic devices such as mobile telephones, information terminals, and PCs.

Figure 10:
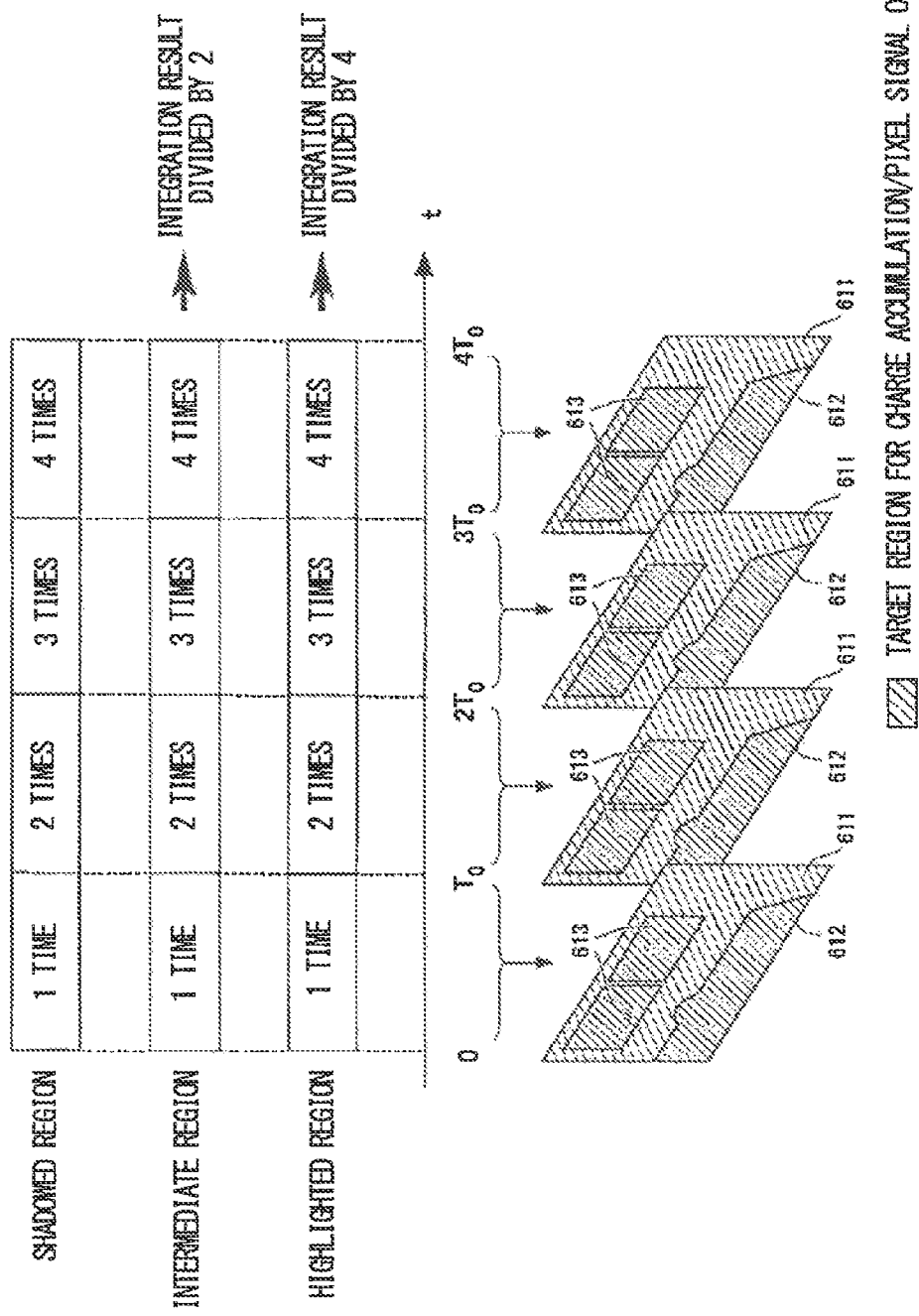
FIG. 10 is a view for describing charge accumulation control performed for each divided region

The following describes additional variations. FIG. 10 is a view for describing charge accumulation control performed for each divided region, as another embodiment. Here, in the same manner as in the example of FIG. 8, an example is described in which the calculating section 512 receives the output of the photometric section 503, there is approximately one grade of difference between the EV value of the intermediate region 612 and the EV value of the highlighted region 613, and there is approximately the same one grade of difference between the EV value of the shadowed region 611 and the EV value of the intermediate region 612. Upon receiving the imaging preparation instruction from the user, in the same manner as the example of FIG. 8, the calculating section 512 determines the common unit time $T_0$ that is the charge accumulation time for one instance of charge accumulation from the photometric section 503.

The calculating section 512 references the calculated difference between the EV value of the highlighted region 613 and the EV value of the intermediate region 612, and determines the number of charge accumulations necessary for the intermediate region 612 to be 2. In the same manner, the calculating section 512 references the calculated difference between the EV value of the highlighted region 613 and the EV value of the shadowed region 611, and determines the number of charge accumulations necessary for the shadowed region 611 to be 4. In the present embodiment, the four repetitions determined for the shadowed region 611, which is maximum number of charge accumulations determined to be necessary, is set as the number of charge accumulations for all regions. In other words, for all regions including the highlighted region 613, the intermediate region 612, and the shadowed region 611, the charge accumulation for the unit time $T_0$ and the reading of the pixel signal corresponding to this charge accumulation are performed four times.

Upon receiving an imaging instruction from the user at time t=0, the drive control section 420 applies the reset pulse and the transfer pulse to pixels in a group associated with one region. This application triggers the start of the charge accumulation for all of these pixels.

At the time $t=T_0$, the drive control section 420 applies the transfer pulse to all of the pixels. The selection pulse is applied sequentially to the pixels in each group, causing each pixel signal to be output to the output wire 309. The drive control section 420 converts each pixel signal into a digital signal using the A/D converter 412*b*, passes the converted signals through the computational circuit 415, and stores the converted signals in the corresponding pixel memories 414. As a result of this process, the first unit control is finished.

When the pixel signals of all of the pixels have been output, the drive control section 420 applies the reset pulse and the transfer pulse again at the time $t=T_0$ to the pixels in the all of the regions, to begin the second charge accumulation. Since time is necessary to select the output of the pixel signals, there is a time difference between the end of the first charge accumulation and the start of the second charge accumulation process. If this time difference cannot be substantially ignored, the second charge accumulation should be started after a delay corresponding to this time difference.

At the time $t=2T_0$, the drive control section 420 applies the transfer pulse to the pixels of all the regions. The selection pulse is sequentially applied to the pixels in these groups, causing the pixel signals to be output to the output wire 309. The drive control section 420 converts these pixel signals into digital signals using the A/D converter 412*b*. In parallel with this process, the pixel signals from the first charge accumulation that are already stored in the corresponding pixel memories 414 are read. The drive control section 420 causes the computational circuit 415 to perform the integration process to add together the pixel signals from the first charge accumulation and the newly acquired pixel signals from the second charge accumulation. The drive control section 420 stores the pixel signals newly generated by this integration process in the corresponding pixel memories 414. As a result, each pixel memory 414 is updated from the pixel signal of the first charge accumulation to the pixel signal resulting from the integration process. With this process, the second unit control is completed.

In the same manner, the third charge accumulation and pixel signal reading is performed from the time $t=2T_0$ to the time $t=3T_0$, and the fourth charge accumulation and pixel signal reading is performed from the time $t=3T_0$ to the time $t=4T_0$. At the time when the fourth integration process is finished, the charge accumulation has been performed four times for the highlighted region 613, but one instance of the charge accumulation is sufficient for this region, and therefore the values of the pixel signals resulting from the integration process are divided by 4. As described above, the unit time $T_0$ is determined such that 80% to 90% of the charge that can be accumulated in one charge accumulation operation is accumulated for the pixels corresponding to a portion that is brightest portion in the highlighted region 613, and therefore saturation does not occur due to each charge accumulation. Accordingly, the image of the highlighted region 613 obtained by dividing the values of the pixel signals resulting from the integration process by 4 can be expected to be an image having almost no halation or black crush, and with suitable exposure that uses the entire dynamic range of the PDs 104.

In the same manner, at the time when the fourth integration process is finished, the charge accumulation has been performed four times for the intermediate region 612, but two instances of the charge accumulation is sufficient for this region, and therefore the values of the pixel signals resulting from the integration process are divided by 2. The image of the intermediate region 612 obtained by dividing the values of the pixel signals resulting from the integration process by 2 can be expected to be an image having almost no halation or black crush, and with suitable exposure that uses the entire bit width of the image data.

The image of the shadowed region 611 obtained by from the pixel signals on which the integration process was performed four times can be expected to be an image having almost no halation or black crush, and with suitable exposure that uses the entire bit width of the image data. In other words, for an under image that is prone to black crush due to insufficient charge accumulation time when a single unit control is performed, by applying the integration process over four instances of the unit control, it is possible to acquire a suitable image that is equivalent to an image obtained when performing the charge accumulation substantially over the interval of $4T_0$.

When the charge accumulation control according to the present embodiment is performed, in a case where the subject moves between regions during the interval of $4T_0$, the resulting image is not an unnatural image in which the subject image appears non-continuous at the boundaries between the regions. For example, when imaging an automobile that moves while sunlight hits a portion of the automobile body, the paths of the shining points in the moving image are not interrupted between regions.

In the control described above, after all of the integration processes are finished, the values for the highlighted region 613 are divided by 4 and the values for the intermediate region 612 are divided by 2. However, the computational circuit 415 may perform the operation to divide the pixel values for the highlighted region 613 by 4 and divide the pixel values for the intermediate region 612 by 2 at the stage where the pixel signals are converted into digital signals and stored in the corresponding pixel memories 414. In other words, during the process of each reading of the pixel signals, the division operation may be performed for each region. With this process as well, the same effect as described above is realized.

The following describes yet another variation. In the embodiment described using FIG. 8, the system control section 501 calculates the luminance distribution of the scene from the output of the photometric section 503 to determine the unit time $T_0$, the region division, and the number of repetitions. However, this information can be determined without obtaining the output result of the photometric section 503.

The system control section 501 determines the unit time $T_0$ from the live view image used as a view finder, for example. At this time, the unit time $T_0$ may be set to a time shorter than the shutter speed for obtaining the live view image, such that the highlighted portion does not experience halation. Upon receiving the manipulation of pressing the shutter switch SW2, which is the imaging instruction from the user, the system control section 501 first performs one instance of the charge accumulation and the pixel signal reading. The system control section 501 analyzes the level of the pixel signals acquired in this manner, divides the regions, and determines the number of repetitions of the charge accumulation for each region resulting from the division. Specifically, a region in which a majority of the pixels accumulated a charge that is 50% or more of the possible charge is determined as a region in which the charge control is finished after one instance, a region in which a majority of the pixels accumulated a charge that is less than 50% and 25% or more of the possible charge is determined as a region in which the charge control is finished after two instances, and a region in which a majority of the pixels accumulated a charge that is less than 25% of the possible charge is determined as a region in which the charge control is finished after four instances. The second and following instances of the charge accumulation and the pixel signal reading then continue to be performed. With this control, the photometric section 503 may be provided independently. As another example, it is possible to switch the control to a type of control that uses the photometric section 503 according to the characteristics of the imaging mode.

As another example, the system control section 501 can perform the first instance of the charge accumulation and pixel signal reading until reaching the region division, and make the determination concerning whether to perform a subsequent charge accumulation and pixel signal reading for each region after reading the signals for each instance. In other words, at the time when m instances (where m is a natural number) of the charge accumulation and the pixel signal reading are finished for a certain region, the system control section 501 ends the processing without performing the (m+1)-th charge accumulation if the value of the pixel signal after the integration process is within a prescribed range, and performs the (m+1)-th charge accumulation if the value of the pixel signal after the integration process is outside of this range. Furthermore, at the time when n instances (where n is a natural number) of the charge accumulation and the pixel signal reading are finished for another region, the system control section 501 ends the processing without performing the (n+1)-th charge accumulation if the value of the pixel signal after the integration process is within a prescribed range, and performs the (n+1)-th charge accumulation if the value of the pixel signal after the integration process is outside of this range.

The above describes an example in which the determination concerning whether to perform a subsequent unit control is made according to whether the average value or the like for each unit group exceeds a threshold value, while sequentially calculating the average value, without using the light measurement result of the photometric section 503, but in this control, the threshold value may be changed according to the number of accumulations. Specifically, the threshold value gradually decreases according to an increase of the accumulation number. By gradually reducing the threshold value, it is possible to generate a natural image in which there is no brightness reversal between the shadowed region and the highlighted region.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

100: imaging element, 101: microlens, 102: color filter, 103: passivation film, 104: PD, 105: transistor, 106: PD layer, 107: wiring, 108: wiring layer, 109: bump, 110: TSV, 111: signal processing chip, 112: memory chip, 113: imaging chip, 131: unit group, 302: transfer transistor, 303: reset transistor, 304: amplification transistor, 305: selection transistor, 306: reset wire, 307: TX wire, 308: decoder wire, 309: output wire, 310: Vdd wire, 311: load current source, 411: multiplexer, 412: signal processing circuit, 413: demultiplexer, 414: pixel memory, 415: computational circuit, 420: drive control section, 430: timing memory, 441: sensor control section, 442: block control section, 443: synchronization control section, 444: signal control section, 500: imaging apparatus, 501: system control section, 503: photometric section, 504: work memory, 505: recording section, 506: display section, 511: image processing section, 512: calculating section, 601: shadowed subject, 602: intermediate subject, 603: highlighted subject, 604: frame, 611: shadowed region, 612: intermediate region, 613: highlighted region

What is claimed is:

1. An imaging unit comprising:
   a first photoelectric section that converts light into a charge, a first signal being generated by the charge converted in the first photoelectric section;
   a second photoelectric section that converts light into a charge, a third signal being generated by the charge converted in the second photoelectric section; and
   a control section that (i) controls, based on the first signal, whether to perform a charge accumulation for a second signal generated in the first photoelectric section after the first signal and (ii) controls, based on the third signal, whether to perform a charge accumulation for a fourth signal generated in the second photoelectric section after the third signal, wherein
   the first photoelectric section and the second photoelectric section are arranged in a first semiconductor chip on which light is incident,
   the control section is arranged in a second semiconductor chip that is connected to the first semiconductor chip, and
   the first semiconductor chip is stacked on the second semiconductor chip.

2. The imaging unit according to claim 1, comprising:
   a first storage section that stores the first signal; and
   a second storage section that stores the third signal, wherein
   the control section controls whether to perform the charge accumulation for generating the second signal in the first photoelectric section based on the first signal stored in the first storage section and controls whether to perform the charge accumulation for generating the fourth signal in the second photoelectric section based on the third signal stored in the second storage section.

3. The imaging unit according to claim 2, wherein:
   the control section causes a fifth signal to be generated based on the first signal stored in the first storage section and the second signal, and
   the control section causes a sixth signal to be generated based on the third signal stored in the second storage section and the fourth signal.

4. The imaging unit according to claim 3, wherein the control section causes the fifth signal to be stored in the first storage section and the sixth signal to be stored in the second storage section.

5. The imaging unit according to claim 2, comprising:
   a first computational circuit that performs a computation using the first signal stored in the first storage section; and a second computational circuit that performs a computation using the third signal stored in the second storage section, wherein the control section controls whether to perform the charge accumulation for generating the second signal in the first photoelectric section based on a computation result of the first computational circuit and controls whether to perform the charge accumulation for generating the fourth signal in the second photoelectric section based on a computation result of the second computational circuit.

6. The imaging unit according to claim 5, wherein:

the first computational circuit generates a fifth signal based on the first signal stored in the first storage section and the second signal, and the second computational circuit generates a sixth signal based on the third signal stored in the second storage section and the fourth signal.

7. The imaging unit according to claim 6, wherein the first storage section stores the fifth signal generated by the first computational circuit, and the second storage section stores the sixth signal generated by the second computational circuit.

8. The imaging unit according to claim 7, wherein the first storage section stores the fifth signal by replacing the first signal, and the second storage section stores the sixth signal by replacing the third signal.

9. The imaging unit according to claim 2, wherein the first storage section and the second storage section are arranged in the second semiconductor chip.

10. The imaging unit according to claim 2, comprising:

a first converting section that converts an analog signal into a digital signal; and a second converting section that converts an analog signal into a digital signal, wherein the first storage section stores the first signal that has been converted into a digital signal using the first converting section, and the second storage section stores the third signal that has been converted into a digital signal using the second converting section.

11. The imaging unit according to claim 10, wherein the first storage section, the second storage section, the first converting section, and the second converting section are arranged in the second semiconductor chip.

12. The imaging unit according to claim 1, comprising:

a first transfer section that transfers the charge of the first photoelectric section; and a second transfer section that transfers the charge of the second photoelectric section, wherein the control section controls the first transfer section such that the charge accumulation for generating the second signal in the first photoelectric section is performed, and controls the second transfer section such that the charge accumulation for generating the fourth signal in the second photoelectric section is performed.

13. The imaging unit according to claim 1, comprising:

a first reset section that resets a potential of a first floating diffusion to which the charge from the first photoelectric section is transferred; and a second reset section that resets a potential of a second floating diffusion to which the charge from the second photoelectric section is transferred, wherein the control section controls the first reset section such that the charge accumulation for generating the second signal in the first photoelectric section is performed, and controls the second reset section such that the charge accumulation for generating the fourth signal in the second photoelectric section is performed.

14. The imaging unit according to claim 1, wherein:

a plurality of the first photoelectric sections are arranged in a first region in which light is incident, and a plurality of the second photoelectric sections are arranged in a second region in which light is incident, the second region being different from the first region.

15. The imaging unit according to claim 14, wherein:

the plurality of the first photoelectric sections are arranged in a row direction and in a column direction, in the first region, and the plurality of the second photoelectric sections are arranged in the row direction and in the column direction, in the second region.

16. The imaging unit according to claim 14, wherein the second region is arranged in a row direction side from the first region.

17. An electronic device comprising the imaging unit according to claim 1.

* * * * *